United States Patent Office 3,239,539
Patented Mar. 8, 1966

3,239,539
GEM DIMETHYLOL ALICYCLIC ESTERS
Jeffrey H. Bartlett, New Providence, N.J., Robert S. Brodkey, Columbus, Ohio, and Paul V. Smith, Jr., Westfield, and Herbert K. Wiese, Cranford, N.J., assignors to Esso Research and Engineering Company, a corporation of Delaware
No Drawing. Filed Dec. 2, 1960, Ser. No. 73,188
2 Claims. (Cl. 260—348)

The present invention relates to esters of dimethylol alicyclic hydrocarbons and their use as plasticizers for hydrocarbon polymers. One embodiment of the invention concerns the use of esters of dimethylol alicyclic hydrocarbons as plasticizers for solid polymers, especially resins. Another embodiment relates to their use as lubricants.

Plasticizers, such as di-isooctyl phthalate (DIOP) and di-2-ethyl hexyl phthalate (DOP), have been widely used in plastic and rubbery compositions. In most cases, it is desirable to use a plasticizer which is heat stable, relatively non-volatile and oil insoluble. The phthlates are not entirely satisfactory because they have a rather low heat stability and high volatility.

It has now been discovered that certain esters of dimethylol alicyclic hydrocarbons, particularly gem dimethylols, make excellent lubricants and lubricant additives as well as plasticizers for rubbery polymers and resins. They are particularly effective in vinyl resins, especially vinyl chloride-containing resins. These esters are unique in that they possess both a low volatility and a high heat stability.

This is a continuation-in-part of patent application Serial No. 612,355 filed September 27, 1956 and now abondoned.

The resins falling within the scope of the present invention are prepared from vinyl derivatives, such as polyvinyl chloride and vinyl chloride-vinyl acetate copolymers containing between 80 and 95 wt. percent vinyl chloride and 5 and 20 wt. percent vinyl acetate. These resins generally have a specific viscosity (68/68° F.) between about 0.2 and 1.2 and a softening point between about 150 and 160° F. For instance, a vinyl chloride resin, sold under the name of Geon 101, is a white powder having a specific gravity of 1.40±0.5, a specific viscosity of between 0.52 and 0.57, a heat loss of 0.5%, an ash of 0.4% and a softening point between 150 and 160° F.

The compounds which fall within the purview of this invention are gem dimethylol alicyclic esters having the general formula:

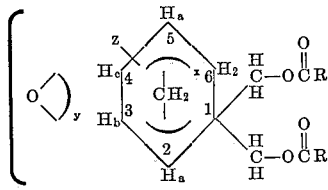

wherein R is a normal or iso-alkyl group having between about 6 and 10 carbon atoms, "$x$" is an integer of 0 to 1, "$a$" is an integer of 0 to 2, "$b$" is an integer of 0 to 2, "$c$" is an integer of 1 to 2, "$y$" is an integer of 0 to 1, "$z$" is a lower alkyl group, such as methyl, or hydrogen. The ring may (or may not) have an unsaturated bond, which is preferably located between positions 3 and 4. The ring has 6 carbon atoms in it and may be classified as cyclohexane, endomethylene-cyclohexane, cyclohexene and endomethylene-cyclohexene.

A few of the compounds that are within the scope of the present invention are:

n-caprylic ester of 1,1-dimethylol cyclohexane
n-caprylic ester of 1,1-dimethylol (3 or 4) methyl cyclohexane
n-caprylic ester of 1,1 dimethylol cyclohexene-3
n-capric ester of 1,1-dimethylol-3,4-epoxy cyclohexane
n-caprylic ester of 1,1-dimethylol 2,5-endomethylene cyclohexene-3, and
n-caprylic ester of 1,1-dimethylol 2,5-endomethylene 3,4 epoxy cyclohexane.

These compounds, as well as others not specifically mentioned above, may be prepared from cyclohexene-3 carboxaldehyde, which as made by condensing butadiene with acrolein, or 2,5-endomethylene cyclohexene-3 carboxaldehyde, which is sometimes called 2,5-methano cyclohexene-3 carboxaldehyde and is prepared by condensing cyclopentadiene and acrolein. If the cyclohexane type ring is desired, the double bond may be saturated with hydrogen according to conventional techniques. In either case, the aldehyde is condensed with formaldehyde to form the gem dimethylol derivative which is, in turn, esterified with a 6 to 10 carbon atom acid to produce the compounds of the present invention.

For instance, the dimethylol derivative may be prepared as follows: a mixture of 252 grams of aldehyde (methyl hexahydrobenzaldehyde), 600 cc. of ethyl alcohol and 325 grams of a 37% formaldehyde solution, in a four-neck flask equipped with a dropping funnel, stirrer and reflux condenser, was heated to 20 to 40° C. and maintained at that temperature while a 50% solution of 176 grams of sodium hydroxide was added. The mixture was stirred at room temperature for 18 hours. The reaction mixture was then extracted with diethyl ether. The diol obtained from the ether solution boiled between 116° and 137° C. at 1.7 mm. pressure.

The epoxy derivative of the gem dimethylol alicyclic compound may be prepared by treating the unsaturated ester with glacial acetic acid and hydrogen peroxide, according to the following procedure: 0.1 mole of the ester, 18 grams of an acid-washed cation exchange resin treated with 2.75 grams of acetic acid, and 0.055 mole of acetic acid were mixed in a 1 litre vessel with a stirrer, thermometer and dropping funnel. While the mixture was stirred vigorously, 0.11 moles of hydrogen peroxide is added so that the temperature reaches 60° C. in 15 minutes. The temperature is maintained at 60° C. for 2 hours and then cooled and filtered. The filtrate is then mixed with 100 ml. of cold 1% sodium chloride solution and the oily layer which separates out is washed with 100 ml. portions of 1% sodium chloride, 5% sodium bicarbonate, 1% sodium chloride and two 100 ml. portions of water, respectively. The oil is then dried under vacuum at 100° C.

Any conventional techniques may be used to esterify the diols. The esterification of the gem dimethylol alicyclic compounds may be carried out, if desired, in the presence of a catalyst. For instance, the dimethylol derivatives and acids were condensed in toluene in the presence of 2 grams of p-toluene sulfonic acid at the boiling point of the mixture until no more water could be removed as an azeotrope. The reaction mixture was diluted with toluene and washed with a 5% NaOH solution and finally with water to remove any acids. The toluene was evaporated on a steam bath and the ester distilled through a short path still. The reaction time is generally between 2 to 5 hours at a temperature between about 125 and 175° C.

The acid used in the preparation of the esters should have between about 6 and 10 carbon atoms, and preferably about 8 carbon atoms. It has been noted that the straight chain acids, as distinguished from the iso, or branched-chain type acids, form the more desirable esters, and therefore they are preferred.

The amount of plasticizer employed with a given polymer will vary according to the particular compound or mixture of compounds used, and the type of product desired. Data obtained in a previous study indicates it is generally desirable to use between about 25 and 75 parts by weight plasticizer per 100 parts by weight polymer, and it is especially desirable to use between about 40 to 60 parts by weight of the plasticizer. In the case of vinyl chloride-containing resins, a desirable quantity of gem dimethylol $C_6$ alicyclic ester is about 50 parts by weight.

In addition to the ester plasticizer, the polymer may contain stabilizers, such as barium ricinoleate, cadmium naphthenate, sodium citrate, dibasic lead stearate and alkali metal organo phosphates; the last two substances are sold under the trade names DS207 and Vanstay, respectively. They are generally used in amounts between about 0.1 and 15 parts by weight per 100 parts by weight of polymer. It is usually preferred to use between about 1 and 5 parts by weight of these stabilizers.

The following examples are submitted to give a better understanding of the invention. In each example the polymer was compounded according to the following formula, in which the only variable is the particular plasticizer under consideration.

Ingredients: Parts by Wt.
  Vinyl chloride resin (Geon 101) _____ 100
  Sodium organophosphate [1] _____ 2
  Dibasic lead stearate _____ 1
  Plasticizer (as indicated) _____ 50

[1] Analysis: sodium 16.67%, phosphorous 8.33% and ash 49.12%.

The vinyl chloride-containing compositions of the invention were prepared as follows: 100 parts by weight of Geon 101, a 100% polyvinyl chloride resin, was admixed with between 0.1 to 15 parts by weight of stabilizer to form a dry blend. Between 25 and 75 parts by weight of plasticizer was then admixed with the blend until an almost lump-free composition was obtained. The resulting composition was then homogenized in a suitable mixer, such as a Banbury, and extruded, sheeted and molded into a finished product. The sheeted stock was molded at between 300 and 320° F. in an ASTM mold (D16–41), yielding slabs 6 x 6 x 0.075 inches. Each sample was evaluated for:

(a) Volatility after 7 days at 100° C., by determining the weight loss of plasticizer.

(b) Extractability of the plasticizer with Primol D after 7 days at 52° C., by determining the weight loss of plasticizer.

(c) Dynamic modulus properties at 25, 10, −5 and −20° C., by flexing of the polymer in a film ten thousandths of an inch in thickness 15 times a second and measuring the force with a strain gauge (reported as pounds per square inch $\times 10^{-4}$), (d) Its physical properties, such as tensile strength, modulus at 100% elongation and elongation.

(e) The percent tensile strength and elongation retained after aging 7 days at 100° C.

EXAMPLE 1

Straight chain acids having between 6 and 10 carbon atoms were reacted with gem dimethylol cyclohexane to form esters, compounded with Geon 101 and evaluated as plasticizers.

Table I

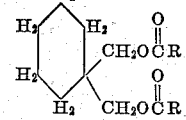

|  | DOP | $C_6$ Acid | $C_8$ Acid | $C_{10}$ Acid |
|---|---|---|---|---|
| Original Properties: | | | | |
| C/O Ratio | 6 | 5 | 6 | 7 |
| Tensile, p.s.i. | 2,900 | 2,695 | 2,635 | 2,340 |
| 100% Modulus, p.s.i. | 1,880 | 2,220 | 1,525 | 1,765 |
| Elongation, Percent | 295 | 295 | 325 | 225 |
| Aged 7 Days at 100° C.: | | | | |
| Tensile | 2,625 | -------- | 2,695 | 2,350 |
| 100% Modulus | 2,310 | -------- | 1,720 | 1,875 |
| Elongation | 180 | -------- | 305 | 205 |
| Percent Tens. Retained | 90 | -------- | 102 | 100 |
| Percent Elong. Retained | 62 | -------- | 94 | 91 |
| Volatility after 7 Days at 100° C., Percent Plasticizer Loss | 21.7 | 56.4 | 7.8 | 5.3 |
| Dynamic Modulus $\times 10^{-4}$: | | | | |
| +25° C. | 1.27 | 0.64 | 0.96 | 2.73 |
| +10° C. | 3.8 | 2.1 | 2.8 | 4.5 |
| −5° C. | 11.5 | 6.6 | 6.1 | 7.4 |
| −20° C. | 19.8 | 15.5 | 14.1 | 11.8 |

The data in Table I show that the ester prepared with an octanoic acid had excellent plasticizer properties. Comparing the volatility of the DOP plasticizer with the octanoic acid ester compound, it immediately becomes evident that the ester is much less volatile. In addition, the percent tensile strength and elongation retained by the vinyl resin containing the ester was much greater than that retained with the phthalate compound.

Insofar as the dynamic modulus is concerned, the $C_8$ ester is superior to the di-2-ethyl hexyl phthalate at all temperatures, while the $C_{10}$ ester was better only at the lower temperatures, e.g. −5 and −20° C.

The $C_6$ ester was not as effective as the other two esters under the conditions employed. These results indicate that the critical carbon to oxygen ratio for this alicyclic plasticizer is between about 6 to 7.

EXAMPLE 2

A mixture of gem 1,1-dimethylol 4-methyl cyclohexane and gem 1,1-dimethylol 3-methyl cyclohexane was esterfied with n-octanoic acid and n-decanoic acid, and the resulting compositions were evaluated as plasticizers.

Table II

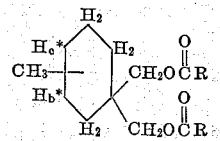

|  | $C_8$ Acid | $C_{10}$ Acid |
|---|---|---|
| Original Properties: | | |
| C/O Ratio | 6.25 | 7.25 |
| Tensile, p.s.i. | 2,745 | 1,590 |
| 100% Modulus, p.s.i. | 1,705 | -------- |
| Elongation, Percent | 310 | 90 |
| Aged 7 Days at 100° C.: | | |
| Tensile | 2,615 | 1,385 |
| 100% Modulus | 2,215 | -------- |
| Elongation | 210 | 50 |
| Percent Tens. Retained | 95 | 87 |
| Percent Elong. Retained | 68 | 56 |
| Volatility after 7 Days at 100° C., Percent Plasticizer Loss | 21.4 | 6.7 |
| Dynamic Modulus $\times 10^{-4}$: | | |
| +25° C. | 1.32 | 4.14 |
| +10° C. | 3.3 | 6.2 |
| −5° C. | 6.9 | -------- |
| −20° C. | 13.7 | -------- |
| Primol D Extraction After 7 Days at 52° C., Percent Plasticizer Loss | 3.1 | 45.8 |

*Where $a=1$, $b=2$; where $a=2$, $b=1$.

The octanoic acid ester was markedly better than the decanoic derivative. This is brought out by a comparison of the dynamic modulus, extractability and tensile strength-elongation retention properties of the two compositions. The resin plasticized with C₈ ester had excellent flexing properties and a low extractability. In addition, an examination of the carbon to oxygen ratio of these two esters makes it apparent that a ratio of about 6.25 is critical in methyl cyclohexane-type compounds.

EXAMPLE 3

Normal hexanoic and octanoic acids were used to prepare esters of gem 1,1-dimethylol cyclohexene-3. The esters were compounded according to the general formula and evaluated as plasticizers.

*Table III*

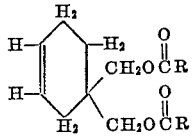

|  | C₆ Acid | C₈ Acid |
|---|---|---|
| Original Properties: |  |  |
| C/O Ratio | 5 | 6 |
| Tensile, p.s.i. | 2,740 | 2,725 |
| 100% Modulus, p.s.i. | 1,515 | 1,590 |
| Elongation, Percent | 300 | 320 |
| Aged 7 Days at 100° C.: |  |  |
| Tensile |  | 2,890 |
| 100% Modulus |  | 2,170 |
| Elongation |  | 260 |
| Percent Tens.-Elong. Retained |  | 106–81 |
| Volatility after 7 Days at 100° C., Percent Plasticizer Loss | 56.4 | 17.5 |
| Dynamic Modulus ×10⁻⁴: |  |  |
| +25° C | 0.64 | 1.18 |
| +10° C | 2.1 | 3.5 |
| −5° C | 6.6 | 8.2 |
| −20° C | 15.5 | 17.1 |

The octanoic ester was eminently better than the hexanoic ester in heat stability and volatility. The critical carbon to oxygen ratio for this group of plasticizers appears to be about 6.

EXAMPLE 4

The following study was undertaken to determine what benefit derived from epoxidizing the gem dimethylol cyclohexene-3 employed in Example 3, after esterification.

*Table IV*

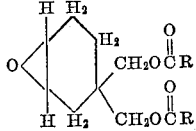

|  | C₈ Acid | C₁₀ Acid |
|---|---|---|
| Original Properties: |  |  |
| C/O Ratio | 4.8 | 5.6 |
| Tensile, p.s.i. | 3,155 | 2,895 |
| 100% Modulus, p.s.i. | 1,805 | 1,945 |
| Elongation, Percent | 300 | 305 |
| Aged 7 Days at 100° C.: |  |  |
| Tensile | 3,280 | 3,100 |
| 100% Modulus | 2,055 | 2,325 |
| Elongation | 310 | 300 |
| Percent Tens.-Elong. Retained | 104–103 | 107–98 |
| Volatility after 7 Days at 100° C., Percent Plasticizer Loss | 8.3 | 0.7 |
| Dynamic Modulus ×10⁻⁴: |  |  |
| +25° C | 0.78 | 1.35 |
| +10° C | 3.7 | 4.3 |
| −5° C | 12.9 | 11.1 |
| −20° C | 22.4 | 20.5 |

The epoxidation of these plasticizers unexpectedly produced a decanoic ester having superior properties to that of the octanoic ester especially as to heat stability, volatility, and low temperature flexibility. This result was completely unexpected in view of the results set forth in Example 3. The critical carbon to oxygen ratio in epoxidized plasticizers appears to be in the range between 4.8 and 5.6.

EXAMPLE 5

Another group of experiments was performed to determine what effect an endomethylene group bridging the 2 and 5 positions of the hexanoic, octanoic and decanoic esters of gem 1,1-dimethylol cyclohexene-3 would have on their plasticizing properties.

*Table V*

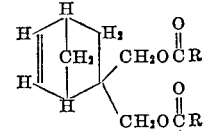

|  | C₆ Acid | C₈ Acid | C₁₀ Acid |
|---|---|---|---|
| Original Properties: |  |  |  |
| C/O Ratio | 5.25 | 6.25 | 7.25 |
| Tensile, p.s.i. | 2,890 | 2,840 | (¹) |
| 100% Modulus, p.s.i. | 1,785 | 1,740 |  |
| Elongation, Percent | 295 | 315 |  |
| Aged 7 Days at 100° C.: |  |  |  |
| Tensile |  | 3,090 |  |
| 100% Modulus |  | 2,395 |  |
| Elongation |  | 310 |  |
| Percent Tens.-Elong. Retained |  | 109–98 |  |
| Volatility after 7 Days at 100° C., percent Plasticizer Loss | 52.6 | 24.5 |  |
| Dynamic Modulus ×10⁻⁴: |  |  |  |
| +25° C | 0.99 | 1.20 |  |
| +10° C | 3.9 | 3.4 |  |
| −5° C | 12.2 | 8.3 |  |
| −20° C | 22.7 | 16.3 |  |

¹ Borderline compatibility.

The data show that the normal octanoic ester makes an excellent plasticizer for resins. The normal decanoic ester had only borderline compatibility and therefore was very difficult to evaluate. On the other hand, the hexanoic ester formed a product having excellent room temperature flexibility, but was inferior to the octanoic ester product in heat stability. The carbon to oxygen ratio data indicate that a ratio of 6.25 is critical for these plasticizers.

EXAMPLE 6

The effect of epoxidizing these endomethylene-cyclohexenes was determined.

*Table VI*

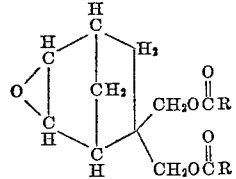

|  | C₈ Acid | C₁₀ Acid |
|---|---|---|
| Original Properties: |  |  |
| C/O Ratio | 5.0 | 5.8 |
| Tensile, p.s.i. | 3,155 | 1,800 |
| 100% Modulus, p.s.i. | 1,750 | 1,500 |
| Elongation, Percent | 325 | 170 |
| Aged 7 Days at 100° C.: |  |  |
| Tensile | 3,145 | 2,035 |
| 100% Modulus | 2,015 | 1,875 |
| Elongation | 305 | 130 |
| Percent Tens.-Elong. Retained | 100–94 | 113–77 |
| Volatility after 7 Days at 100° C.: Percent Plasticizer Loss | 11.9 | 20.4 |
| Dynamic Modulus×10⁻⁴: |  |  |
| +25° C | 0.80 | (¹) |
| +10° C | 4.0 |  |
| −5° C | 13.5 |  |
| −20° C | 22.8 |  |

¹ Poor film.

The data illustrate that both the octanoic and decanoic esters produced resin compositions having very satisfactory heat stability as well as volatility. The latter ester was inferior to the former in that it was much more readily extracted and produced a poor film when prepared for dynamic modulus evaluation.

It has been shown by the foregoing examples that gem dimethylol alicyclic esters are excellent plasticizers for vinyl-containing resins. The results indicate that the carbon to oxygen ratio of these compounds is critical. The critical area is broadly between about 4.8 and 7.25; the preferred ratio is between about 4.8 and 7. An especially desirable carbon to oxygen ratio is between about 4.8 and 6.25.

| Structure of Ester | (SUS) | | V.T. | Pour, °F. | Flash, °F. |
|---|---|---|---|---|---|
| | Vis$_{100}$ | Vis$_{210}$ | | | |
| (structure 1) | 93.3 | 39.7 | 135 | −70 | 495 |
| (structure 2) | 105.2 | 40.5 | 123 | −70 | 490 |
| (structure 3) | 98.3 | 40.3 | 130 | +65 | 500 |
| (structure 4) | 56.9 | 35.5 | 150 | 0 | 455 |

Furthermore, it has been shown that epoxidizing these compounds produces plasticizers having unexpectedly superior properties. For this reason, the epoxidized derivatives of these alicyclic esters are preferred.

As mentioned above, these alicyclic compounds may also be used as synthetic lubricants and lubricant oil additives. It has been noted that the epoxidized derivatives are especially effective as additives to lube oil. The following data were obtained on the normal caprate esters of dimethylol cycloalkanes and of dimethylol cycloalkenes. As synthetic lubricants it will be noted that the dimethylol cycloalkanes show considerable promise in contrast to the dimethylol cycloalkenes. However, the esters of both types of compounds should be very stable as the methylol groups are attached to a neopentyl carbon.

Resort may be had to various modifications and variations of the present invention without departing from the spirit or scope of the appended claims.

What is claimed is:
1. A diester of gem dimethylol alicyclic hydrocarbon epoxide having the general structure:

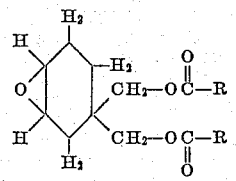

wherein R is a $C_6$ to $C_{10}$ alkyl group.

2. A diester of gem dimethylol alicyclic hydrocarbon epoxide having the general structure:

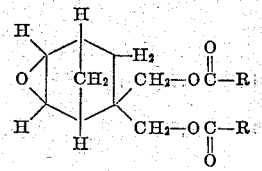

wherein R is a $C_6$ to $C_{10}$ alkyl group.

References Cited by the Examiner
UNITED STATES PATENTS

| | | | |
|---|---|---|---|
| 2,139,369 | 12/1938 | Kyrides | 260—316 |
| 2,480,347 | 8/1949 | Witcoff | 260—410 |
| 2,553,996 | 5/1951 | Abbott | 260—31.6 |
| 2,625,563 | 1/1953 | Bell | 260—488 |
| 2,738,370 | 3/1956 | Staib et al. | 260—410 |
| 2,794,029 | 5/1957 | Phillips et al. | 260—30.4 |
| 2,794,812 | 6/1957 | Phillips et al. | 260—348 |
| 2,814,639 | 11/1957 | Bartlett et al. | 260—31.6 |
| 2,817,673 | 12/1957 | Roelen et al. | 260—410 |
| 2,883,398 | 4/1959 | Frostick et al. | 260—88.3 |
| 2,889,359 | 6/1959 | Guest et al. | 260—488 |
| 2,912,447 | 11/1959 | Brannock | 260—488 |
| 2,924,582 | 2/1960 | Mullins et al. | 260—30.4 |
| 2,924,583 | 2/1960 | Starcher et al. | 260—30.4 |
| 2,999,866 | 9/1961 | Starcher et al. | 260—410 |

FOREIGN PATENTS 569,404   5/1945   Great Britain.

WALTER A. MODANCE, *Primary Examiner.*

DONALD J. ARNOLD, LEON J. BERCOVITZ, LESLIE H. GASTON, A. H. BRODMERKEL, *Examiners.*